United States Patent [19]
La et al.

[11] Patent Number: 5,665,956
[45] Date of Patent: Sep. 9, 1997

[54] BAR CODE READING AND DATA COLLECTION UNIT WITH ULTRASONIC WIRELESS DATA TRANSMISSION

[75] Inventors: Chay La, Rochester; Raymond J. Boyd, Holcomb, both of N.Y.

[73] Assignee: PSC Inc., Webster, N.Y.

[21] Appl. No.: 331,434

[22] Filed: Oct. 31, 1994

[51] Int. Cl.⁶ .................................................. G06K 7/10
[52] U.S. Cl. ........................................ 235/472; 235/462
[58] Field of Search ................................ 235/472, 462, 235/135; 375/1, 75, 59; 359/213, 224; 368/903, 135, 137, 138

[56] References Cited

U.S. PATENT DOCUMENTS

| | | | |
|---|---|---|---|
| 5,157,687 | 10/1992 | Tymes | 235/462 X |
| 5,280,498 | 1/1994 | Tymes et al. | 375/1 |
| 5,331,580 | 7/1994 | Miller et al. | 364/708.1 |
| 5,367,151 | 11/1994 | Dvosskis et al. | 235/472 |
| 5,371,347 | 12/1994 | Plesko | 235/472 X |
| 5,389,917 | 2/1995 | LaManna et al. | 235/472 X |

*Primary Examiner*—Donald T. Hajec
*Assistant Examiner*—Thien Minh Le
*Attorney, Agent, or Firm*—Joseph F. Murphy

[57] ABSTRACT

A bar code scanner includes a separate transmitter and receiver, each being able to ultrasonically transmit and receive data, respectively. The receiver transmits an acknowledgement signal when a protocol is received, and sends the acknowledgement signal to the transmitter which, unless it receives the acknowledgement signal, will retransmit the protocol a predetermined number of times. The transmitter includes a receiver which monitors an ultrasonic frequency band for a time period in which transmission by the transmitter is not allowed. The time period corresponds to a time when another ultrasonic signal in the ultrasonic frequency band is detected by the receiver of the transmitter. Transmission by the transmitter is allowed as soon as the another ultrasonic signal is no longer detected by the receiver of the transmitter.

12 Claims, 17 Drawing Sheets

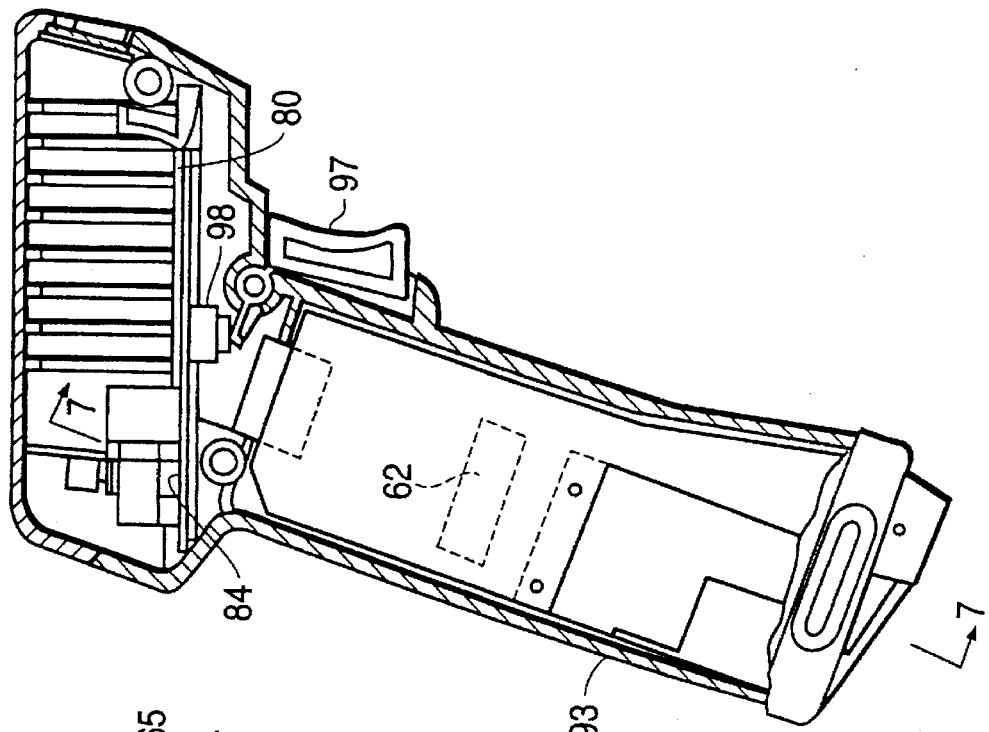
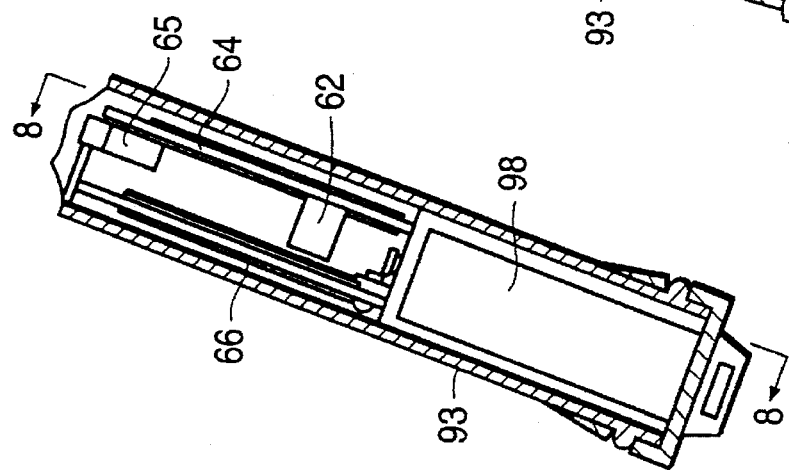
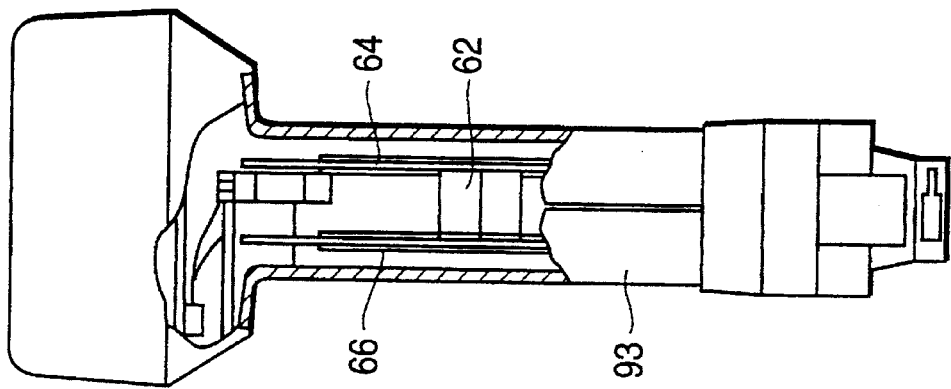

1. TRANSMITTER PROTOCOL:

THE TRANSMITTER WILL ACCEPT DATA FROM THE SCANNER (SERIAL FORMAT). THIS DATA WILL BE PROCESSED TO INCLUDE ALL THE "PROTOCOL" BYTES AND ERROR CHECKING. THE PROTOCOL FORMAT IS AS FOLLOWS:

| AGC BITS | UNIT ID | # SEND | # DATA | DATA 1 .... DATA N | BAUDRATE |

| VERT CHECKSUM | HORZ CHECKSUM |

FIG. 10

THE BYTE DATA FORMAT IS 11 BITS: START BIT, 8 DATA BITS, ONE ODD PARITY BIT, AND ONE STOP BIT. THE TIMING OF A '1' IS 2.5 ms OF NO ULTRASONIC SOUND PLUS 500 us OF 40 Khz ULTRASONIC SOUND. THE TIMING OF A '0' IS 3.0 ms OF NO ULTRASONIC SOUND. START BIT IS 1 ms OF 40 Khz OF ULTRASONIC SOUND. STOP BIT IS 3 ms OF NO ULTRASONIC SOUND.

TIMING DIAGRAM FOR EACH TRANSMISSION:

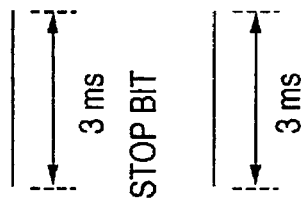

1's TIMING DIAGRAM      0's TIMING DIAGRAM

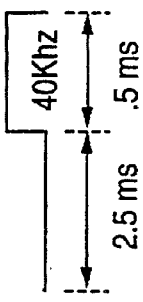 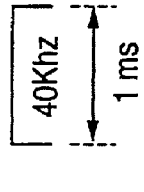

START BIT TIMING DIAGRAM      STOP BIT

ONE BYTE DATA TIMING DIAGRAM

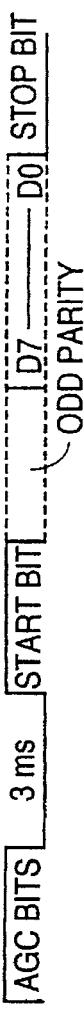

| AGC BITS | 3 ms | START BIT | D7 ——— D0 | STOP BIT |

ODD PARITY

FIG. 11

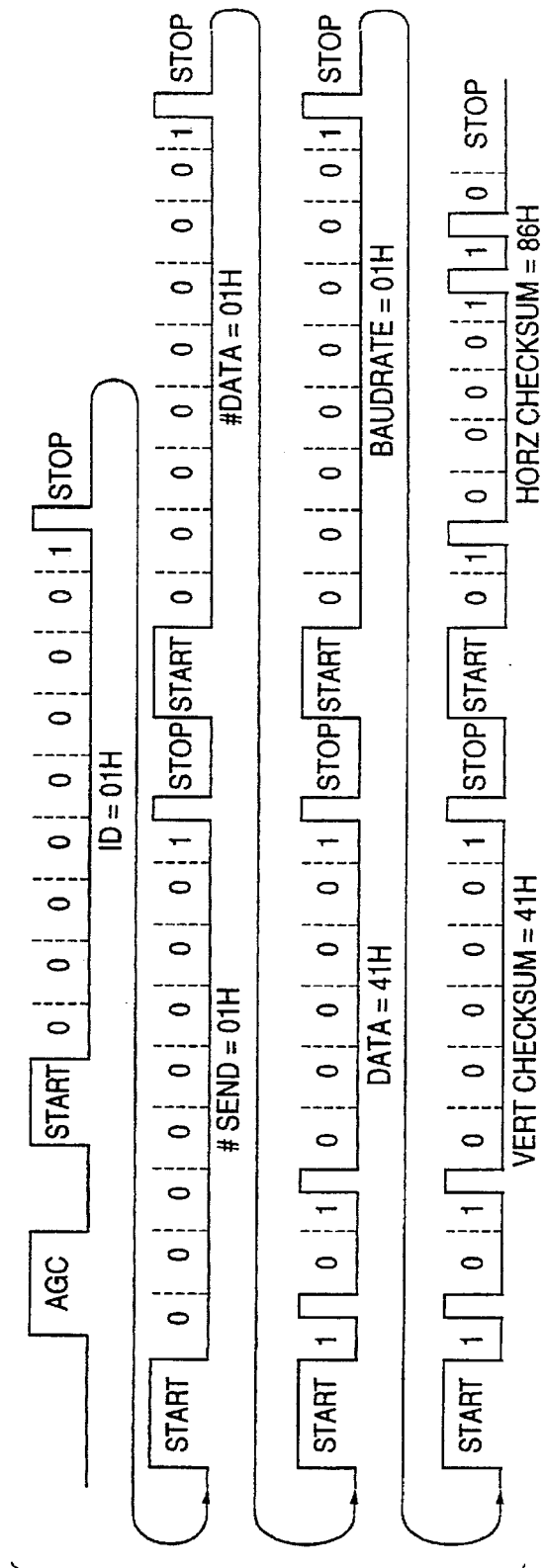

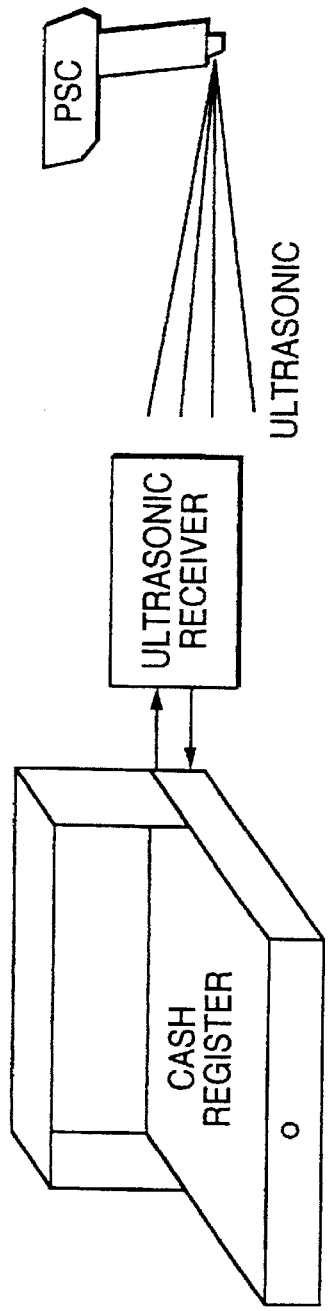
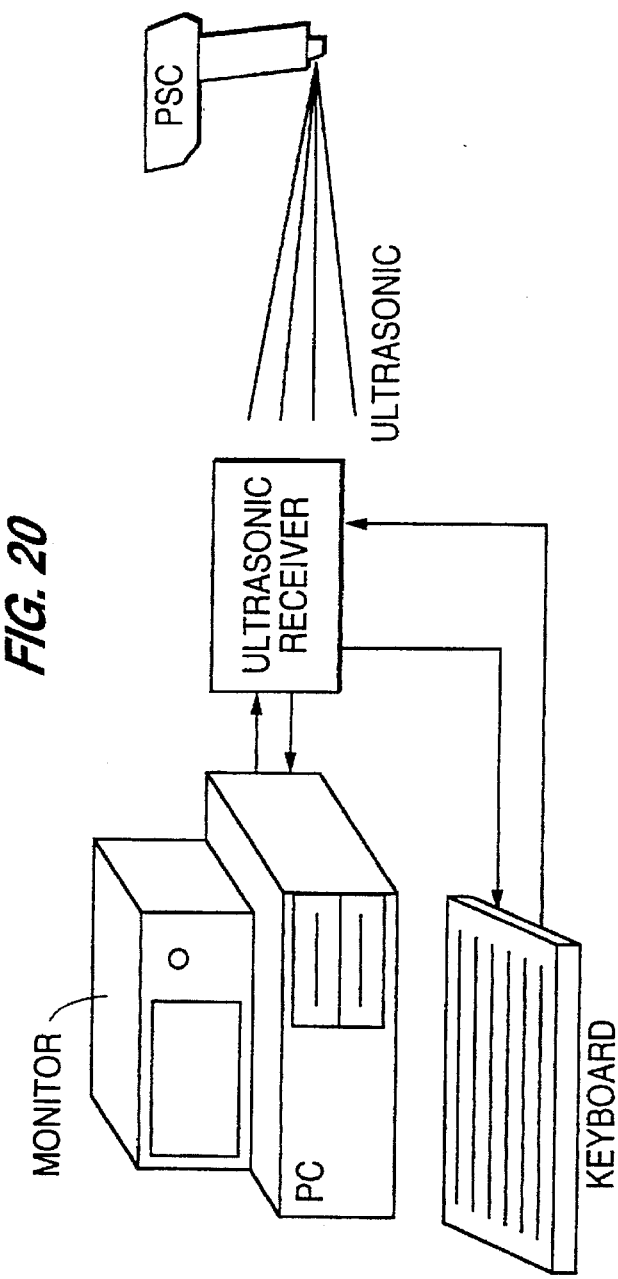

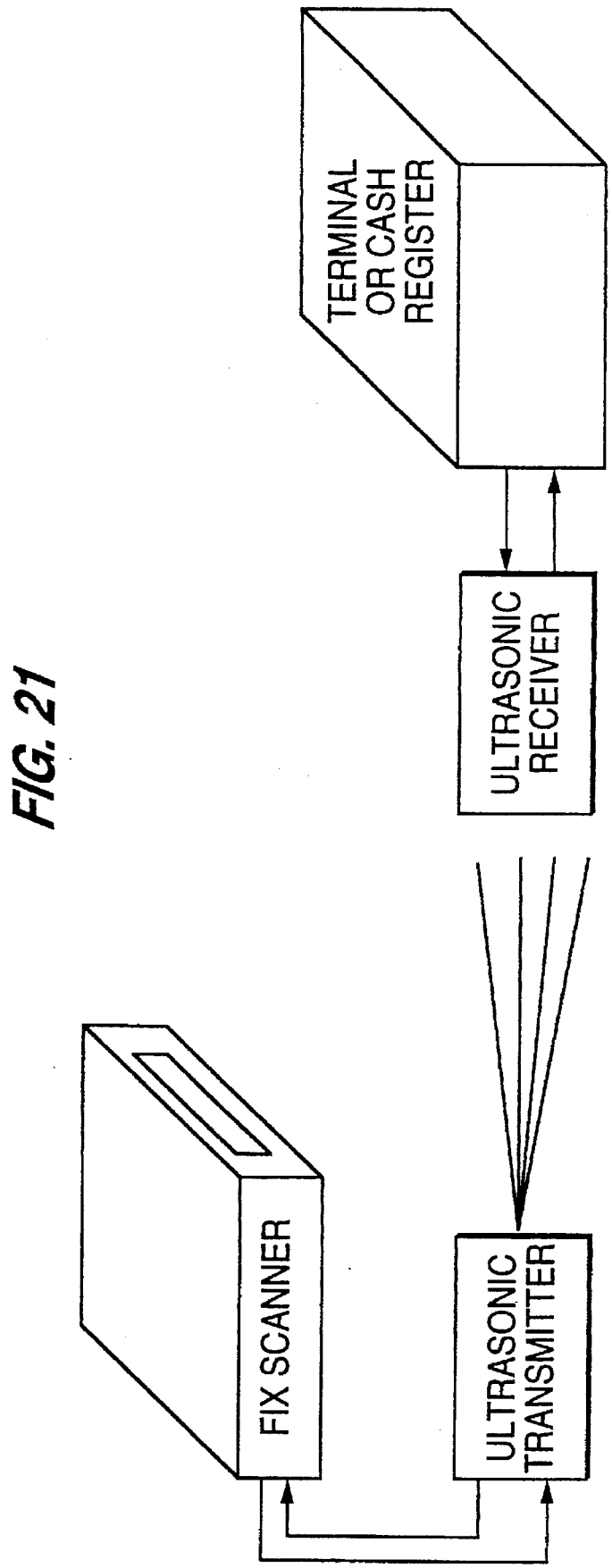

BAR CODE READING AND DATA COLLECTION UNIT WITH ULTRASONIC WIRELESS DATA TRANSMISSION

FIELD OF THE INVENTION

This invention generally relates to systems for scanning and reading bar codes to acquire data for transmission to data processing equipment. This invention specifically relates to a unit, system, circuitry, and a protocol used therewith, for the wireless transmission of the bar code data via the use of a high-frequency ultrasonic link.

The invention is especially suited for providing a wireless bar code scanner and data collection unit which offers the advantages of untethered operation without the disadvantages attendant to radio frequency wireless equipment.

RELATED APPLICATIONS

This application is related to the following U.S. Pat. Nos.: 5,258,604; 5,200,597; 5,329,106; 5,260,554; 5,237,161; 5,233,169; 5,212,372; 5,212,371; 5,208,449; 5,115,120; 5,015,831; 5,317,166; all of which are assigned, along with the present invention, to PSC Inc., and all of which are hereby incorporated by reference.

BACKGROUND AND SUMMARY OF THE FEATURES OF THE INVENTION

Laser scanner bar code reader systems have been in use for some time. These scanners typically comprise a housing having a laser, associated optics, and electronics, all mounted inside the housing. See, for example, U.S. Pat. No. 5,200,597.

DISCUSSION OF THE PRIOR ART

Known laser-scanner based bar code reader systems (henceforth referred to as "scanners" for reasons of brevity) used for wireless transmission of data have typically transmitted and received electromagnetic radiation (EM). This EM is usually in the radio frequency (HF or UHF) portion of the electromagnetic spectrum, (see, eg, U.S. Pat. No. (USP) 5,157,687; U.S. Pat. No. 4,672,658; U.S. Pat. No. 4,740,792 which describe radio frequency (RF) communications) although sometimes the infrared portion of the electromagnetic spectrum is mentioned.

RF systems suffer from a number of technological and legal disadvantages; for example, RF systems create electromagnetic interference which can interfere with the operation of other electronic equipment. RF systems themselves are also vulnerable to electromagnetic interference of other equipment. In addition, RF, being subject to government regulation, which may require obtaining a Federal Communications Commission (FCC) license, has a significant disadvantage therefor.

Seeking to eliminate the need for an FCC license, some use low power transmission equipment, while others use the complex transmission scheme known as "spread spectrum" (see, e.g., U.S. Pat. No. 4,740,792) However, although spread spectrum does not require a license, its high cost and complexity make it unfeasible for many applications.

Thus, it is seen that earlier efforts to transmit bar code data required a choice between imperfect alternatives; between narrow-band RF (inexpensive, but requires an FCC license) and spread spectrum RF (didn't require a license, but it is very expensive).

SUMMARY OF THE INVENTION

Bar code readers and data terminal users have a long-felt need for a wireless data transmission solution which combines the low cost of a simple narrow-band RF unit with the license-free convenience of a costly spread spectrum system.

The principal object of the present invention is to provide an improved ultrasonic system used for the wireless transmission of bar code data (or other digital or analog data) via the use of a high-frequency ultrasonic link.

While ultrasonic devices are used, for example, in transmitting underwater voice communications, ultraschics have not heretofore been adopted for the transmission of data representing bar codes for a portable bar code scanner.

Briefly described, a bar code scanner incorporating the invention has means for generating data formatted in accordance with a predetermined protocol which includes data representing control data as well as data representing the code, separate transmitter & receiver means are provided, respectively having means for ultrasonically transmitting and receiving and transmitting an acknowledgement signal when the protocol is received. Thus the receiver sends an acknowledgement to the transmitter, which, unless it receives same, can retransmit the protocol a predetermined number of times.

BRIEF DESCRIPTION OF THE DRAWINGS

FIG. 4 shows the back view of a hand-held laser scanner in cut-away, revealing both the decoder board ("motherboard") and the interface/transceiver board ("daughterboard")

FIG. 5 is a sectional view of FIG. 6 taken along line 7.

FIG. 6 is a sectional view of the hand-held laser scanner of FIG. 1, showing the decoder board ("motherboard") and the connector for mounting the interface/transceiver board ("daughterboard").

FIG. 10 depicts a transmission protocol according to the present invention.

FIG. 11 depicts a timing diagram for each data transmission according to the present invention.

FIG. 12 illustrates the transmission of the barcode "A" according to the present invention.

FIG. 13 is a block diagram showing the signals used to send the barcode "A" in accordance with the present invention.

3

Figure 17A:
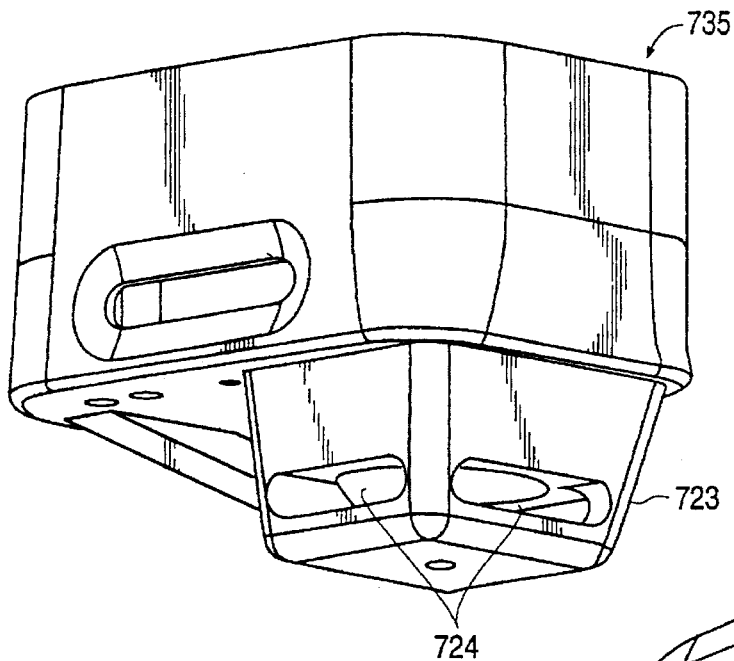
FIG. 17A is a perspective view of a scanner endcap according to the present invention, showing an endcap adapted to receive and/or house an ultrasonic transceiver.
Figure 17B:
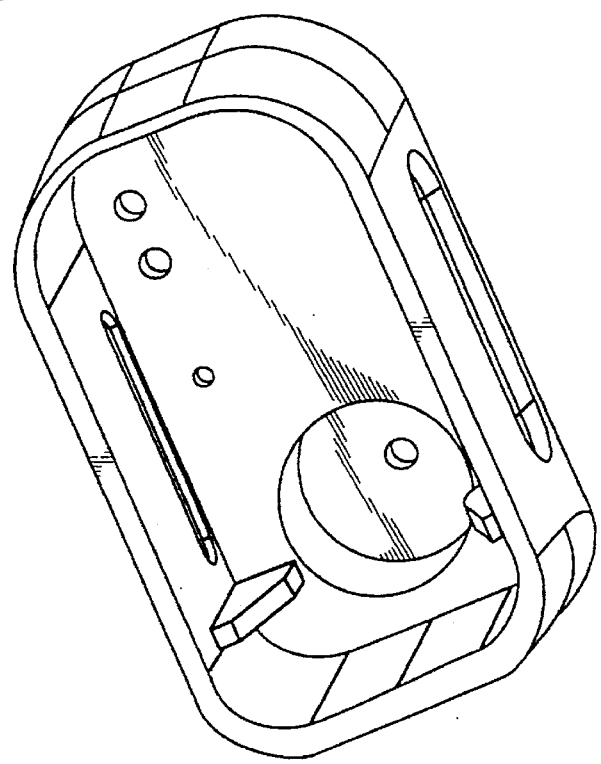

FIG. 17B is a top view of the endcap in FIG. 17A.

Figure 18:
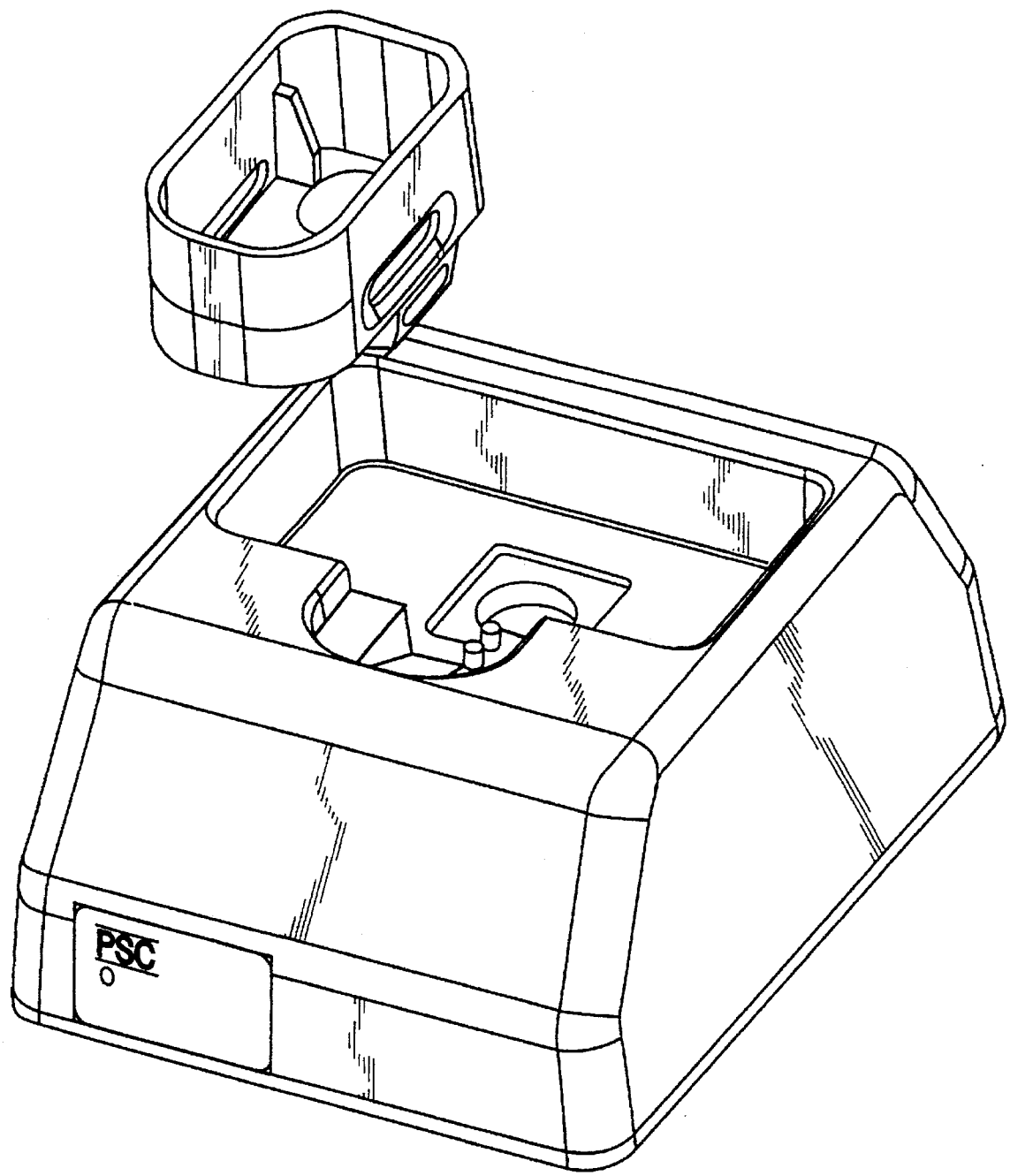

FIG. 18 depicts one embodiment of a base stand used in accordance with the present invention (charger and downlink).

FIG. 19 depicts a cash register receiver used in connection with the present invention.

FIG. 20 depicts a handleless bar code scanner in connection with the present invention.

FIG. 20 depicts a DC wedge received used in connection with the present invention.

FIG. 21 depicts a fixed position scanner used in accordance with the present invention.

Figure 22:
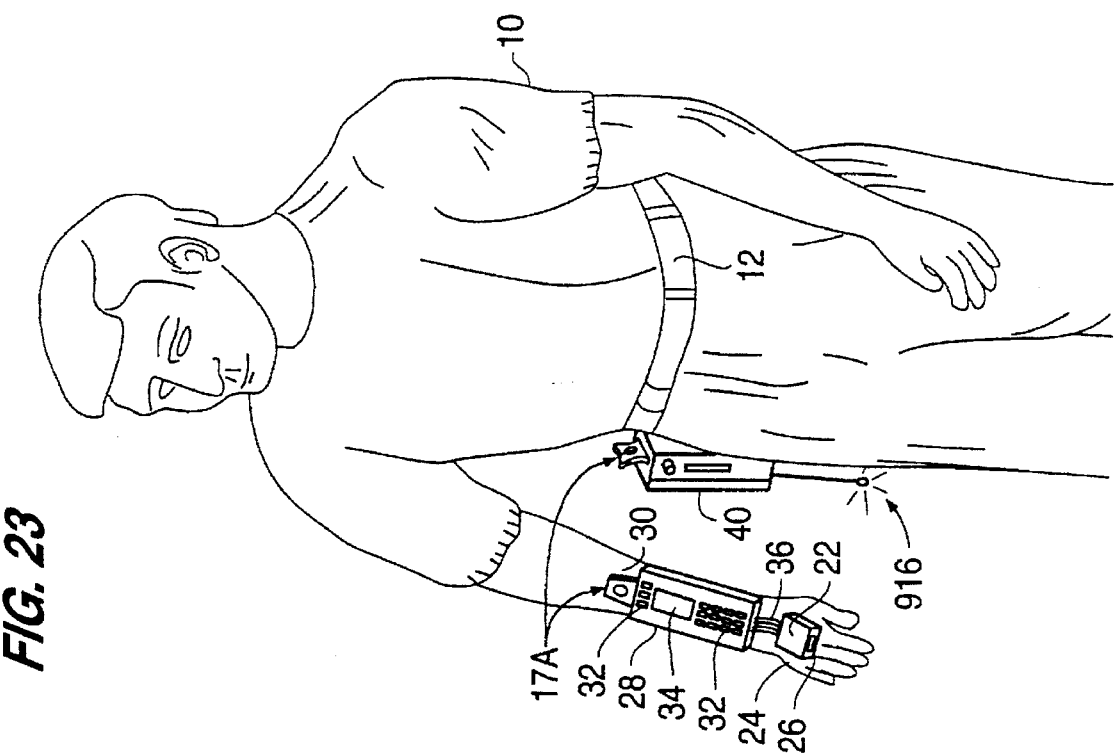

FIG. 22 depicts a conventional handleless bar code scanner, and which requires cable 38 to carry signals from arm unit 28 to belt data processing/recording/transmitting unit 40.

Figure 23:
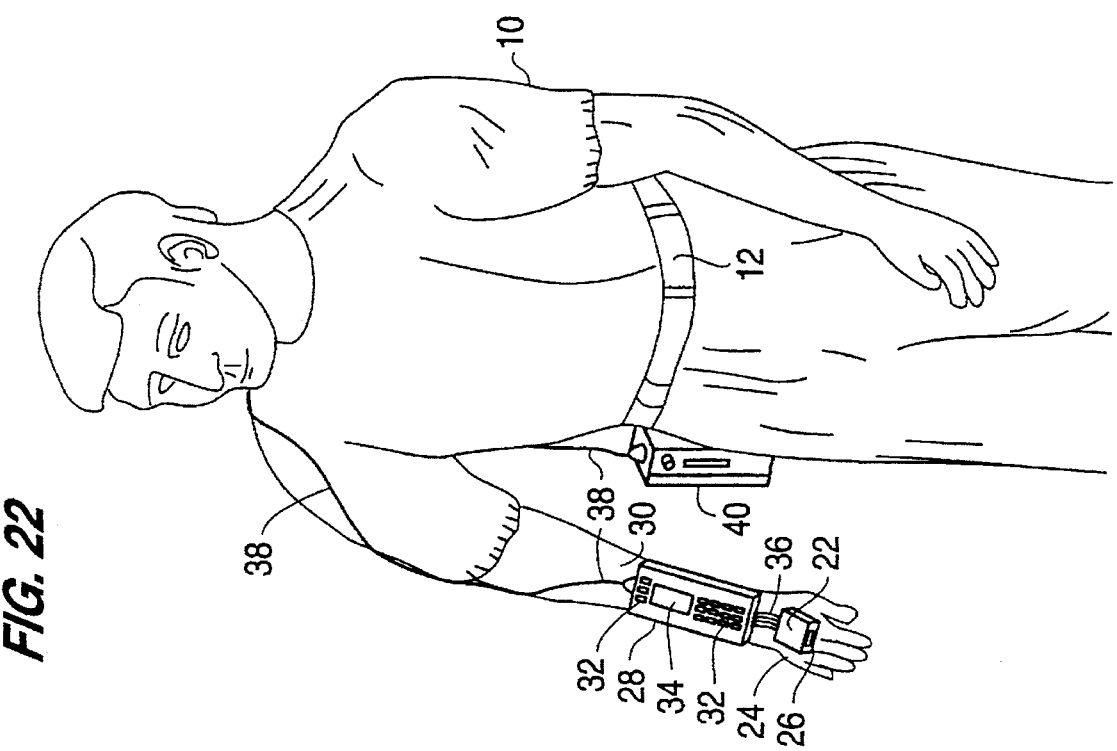

FIG. 23 depicts a RF repeater 91b used in connection with the present invention; it is somewhat similar to that of FIG. 22 but has eliminated the cable 38 of FIG. 22, and instead uses an ultrasonic link of the type disclosed herein, which link is established between the two ultrasonic transducers, each labelled 17A, to carry signals from arm unit 28 to belt data processing/recording/transmitting unit 40 without the need for a cable 38, as was used in FIG. 22. Note that the signal received at 17A on unit 40 may be reprocessed and/or retransmitted as RF from RF transmitter or transceiver 91b, thus allowing for increased range of operation.

DETAILED DESCRIPTION

Figure 1:
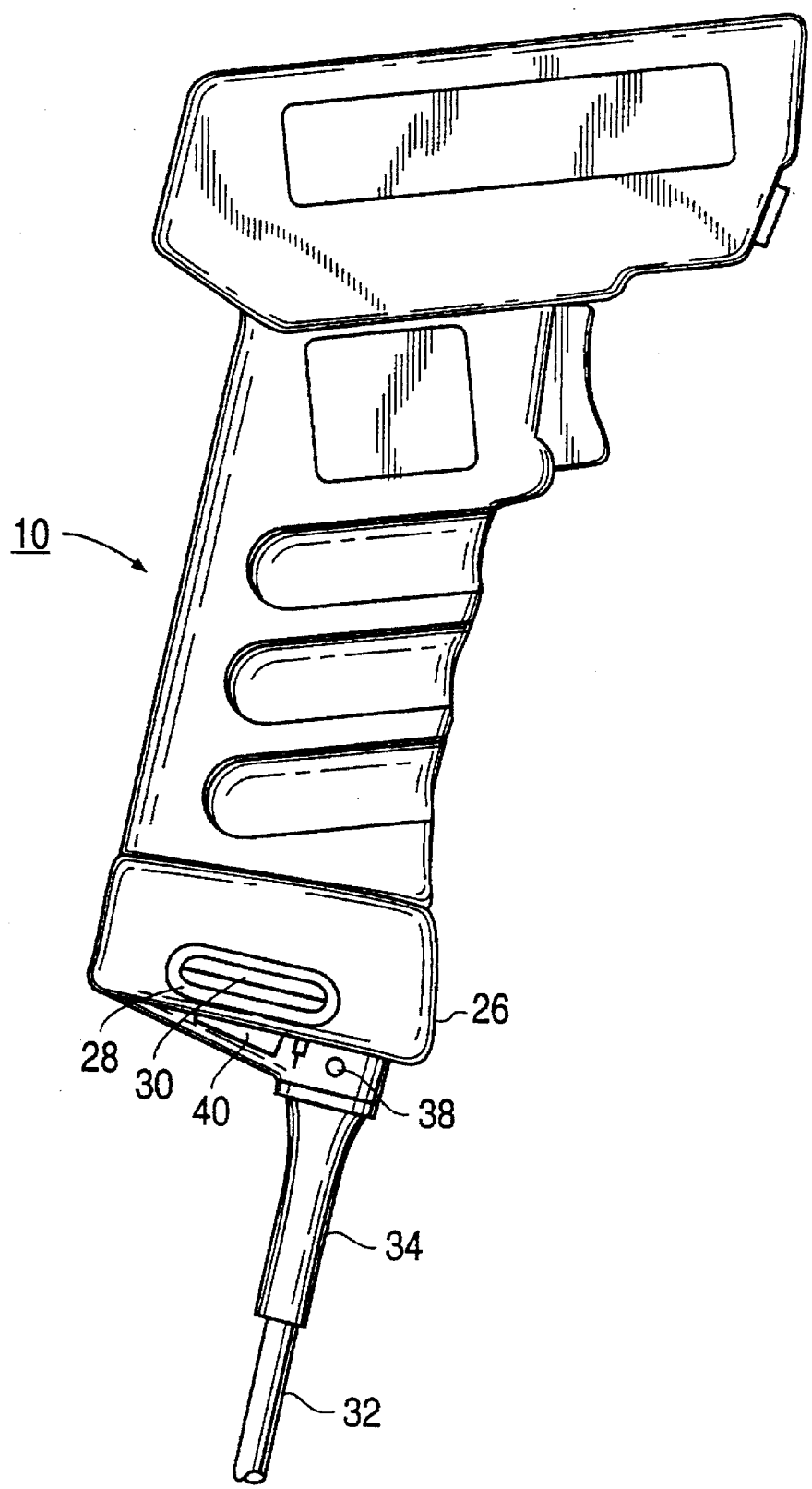
FIG. 1 shows a right side view of a hand-held laser scanner of the prior art (with cable endcap).
Figure 2:
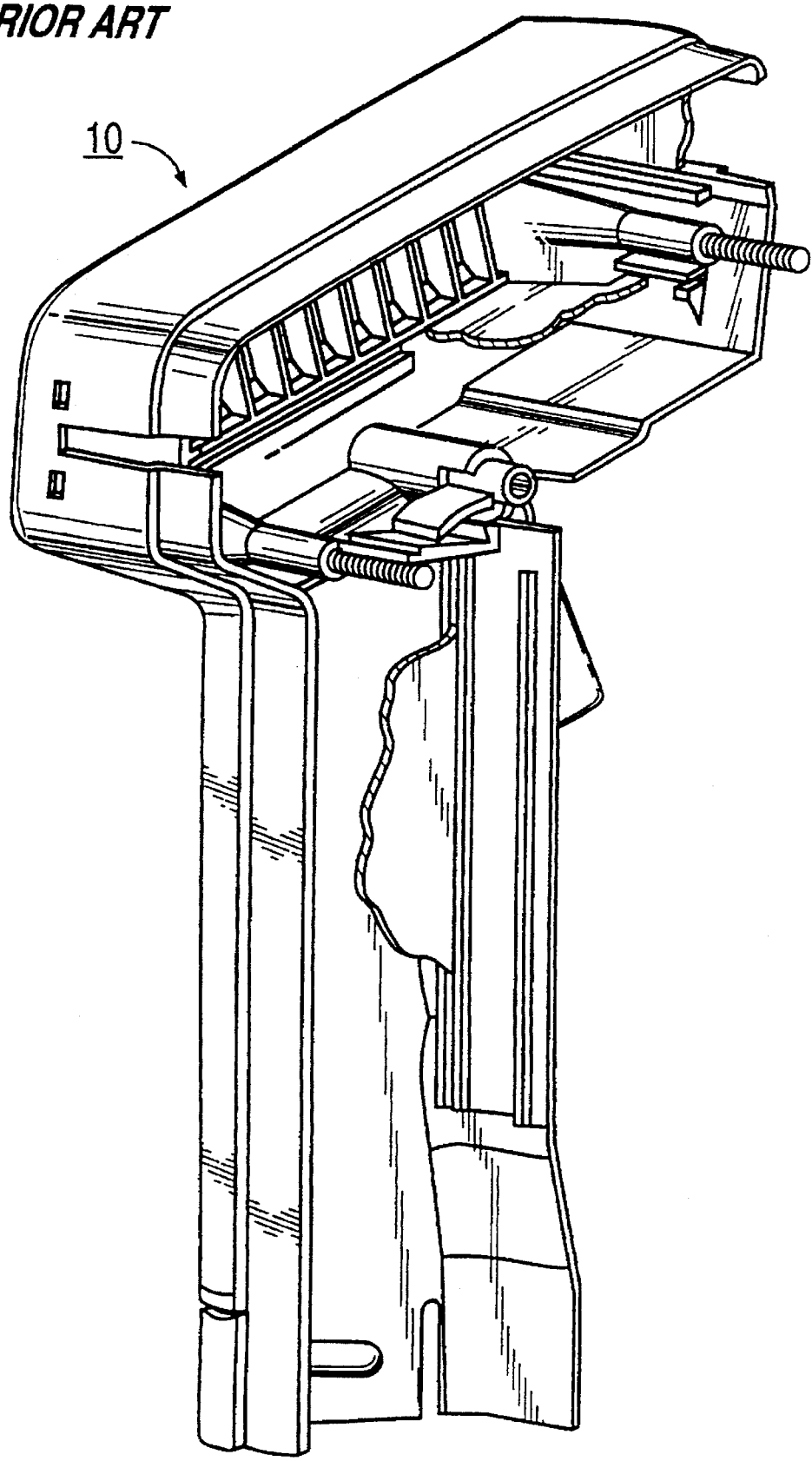
FIG. 2 shows one half of the housing of FIG. 1, with the endcap removed.
Figure 3:
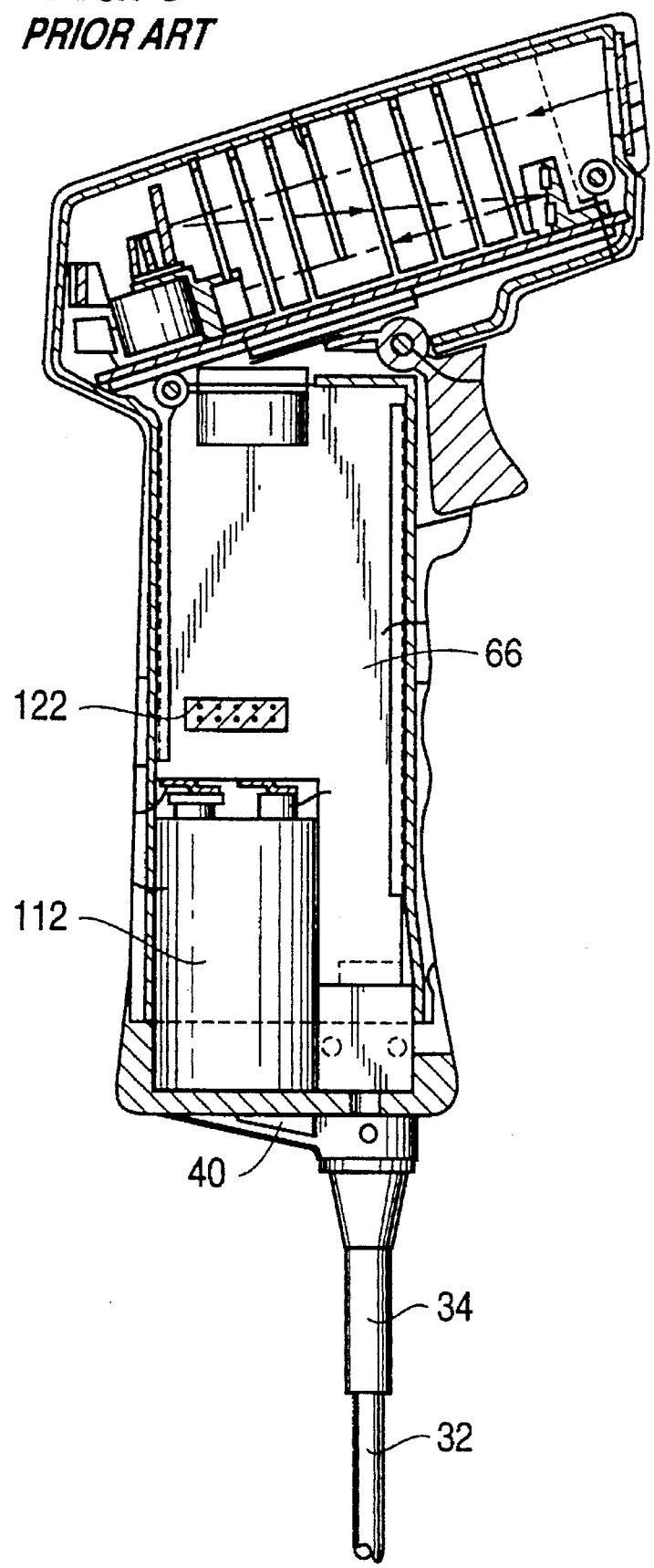
FIG. 3 shows a sectional view of the hand-held laser scanner of FIG. 1, showing the decoder board ("motherboard") and the connector for mounting the interface/transceiver board ("daughterboard")
Figure 7:
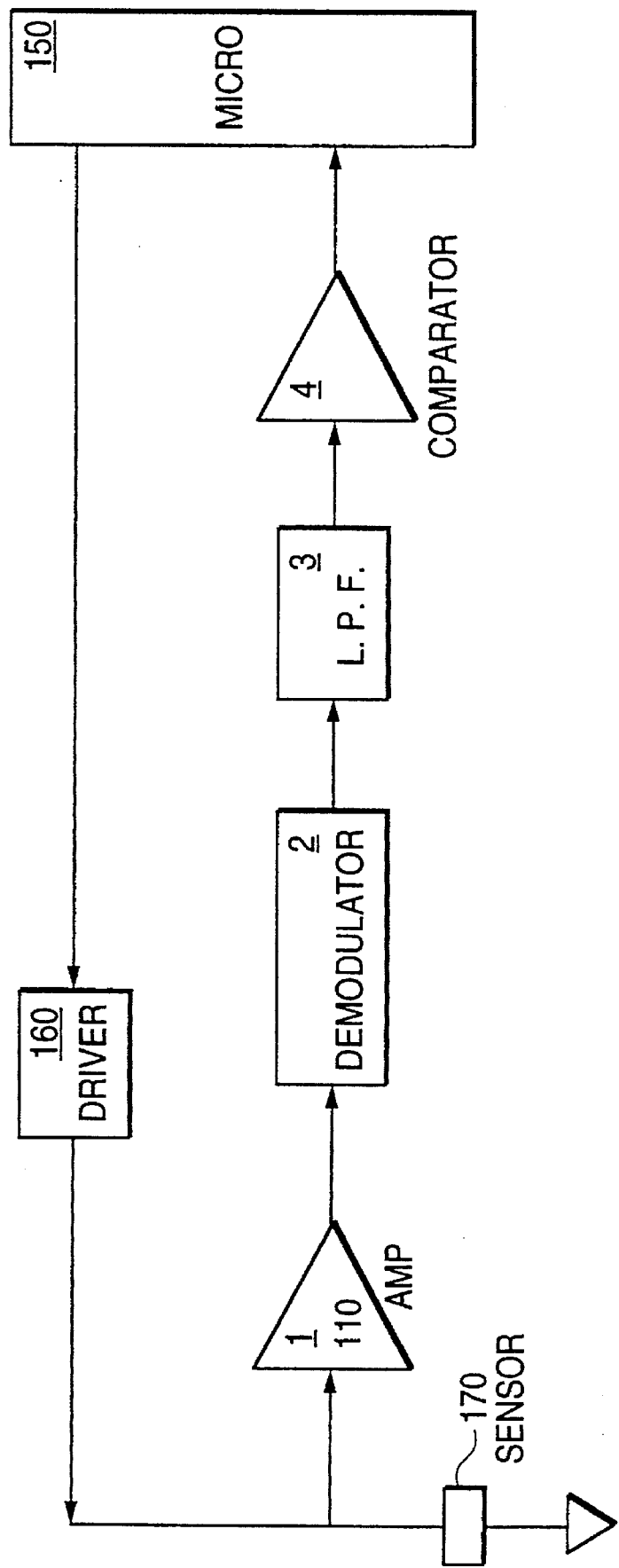
FIG. 7 is a block diagram of a transmitter according to the present invention.

Reference is now made to FIG. 7, a block diagram of a transmitter according to the present invention. A microprocessor 150, with data to be transmitted, feeds the data into driver 160, which drives the data into ultrasonic transmitter 170. In accordance with a presently preferred embodiment, there are also provided an Amp 110, a Demodulator 2, a low pass filter 3, and a comparator 4 for providing a "listening path" for determining a clear time to transmit, as will be described in more detail hereinbelow.

Figure 8:
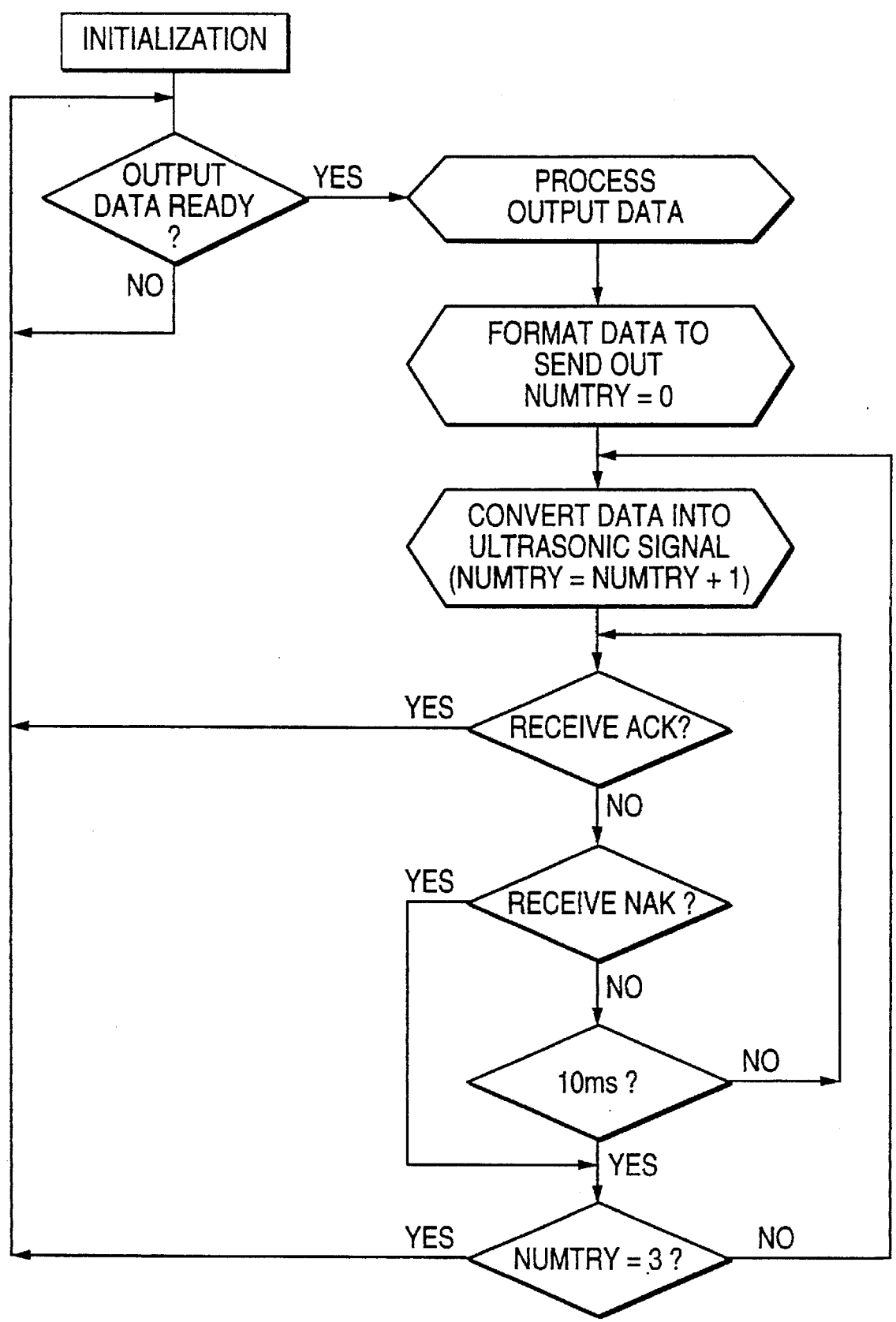
FIG. 8 is a flowchart of the operation of a transmitter according to the present invention.
Figure 9:
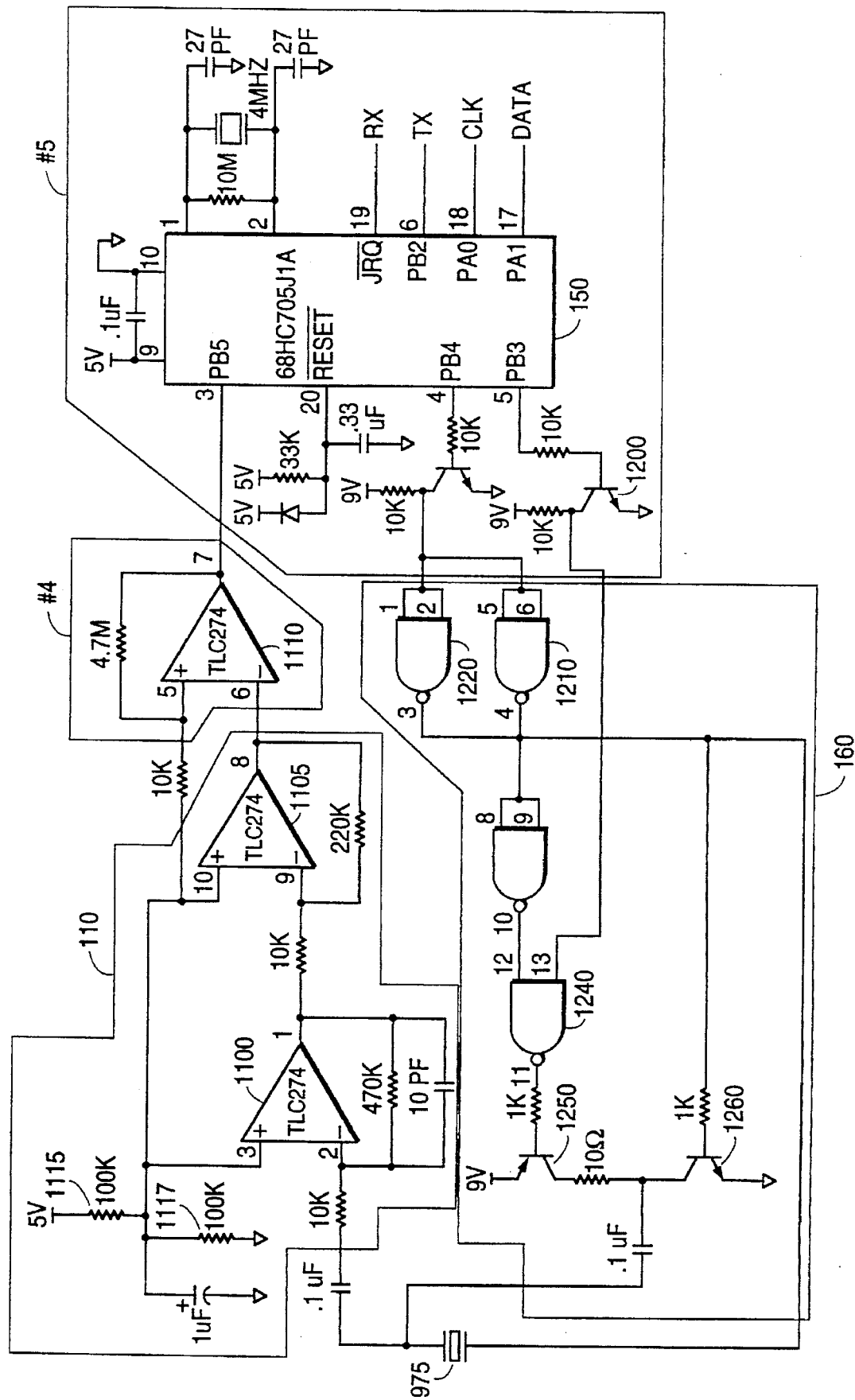
FIG. 9 is an electrical schematic of a transmitter according to the present invention.

Transmitter operation may be understood by reference to FIG. 8, which illustrates a flowchart of a transmitter according to the present invention, and to FIG. 9, which is an electrical schematic of a transmitter according to the present invention.

The transmitter is designed to listen before transmitting, so that it transmits when its transmitter frequency is "clear". To listen, the microprocessor 150 puts a high on its pin 5, which is connected to the base of npn transistor 1200. Thus, transistor 1200 is put into a closed circuit condition, which presents a logic low into the driver circuit 160 at pin 13 of NAND gate 1240. Since the NAND gate's other input pin, pin 12, is in a don't care condition, the low at pin 13 makes the NAND gate's 1240 output high. NAND gate 1240's output is applied to the base of pnp transistor 1250, which puts pnp transistor 1250 into an open circuit condition, thereby disconnecting transducer 975 from its source of power, the 9 V connected to the emitter terminal of transistor 2250. Without power, it is assured that the transducer 975 can't be driven, and thus no transmission can occur.

As will be seen below, the transmitter now may be used to "listen" for a clear time to transmit. This listening is accomplished with transducer 975 connected to pin 2 of op-amp 1100 in amplifier 110, so as to hear any ultrasonic signal already present and preexisting in the air (henceforth, this preexisting signal will be referred to as the "preexisting signal"). If a pre-existing signal is present, it is picked up by the transmitter 975 (which acts as a crude receiver, just as an audio speaker may be used as a crude microphone) and is amplified by amplifier 110. Amplifier 110 comprises op amps 1100 and 1105, which are connected together, with the output of op-amp 1100 connecting to the inverting input of op-amp 1105.

The preexisting signal leaves amplifier 110 and enters the inverting input of comparator 1110. Comparator 1110 compares the now-amplified preexisting signal with a 2.5 V reference, which is provided at the non-inverting input by the voltage divider comprising resistors 1115 and 1117. The result of the comparison enters microprocessor 150 at pin 3. While pin 3 continues to receive the ultrasonic signal, the circuit is inhibited from transmitting bar code data, until it stops "hearing" the ultrasonic circuit.

Transmission of data in accordance with the present invention may be accomplished as follows. Before any transmission, a laser scanner scans a bar code, thereby acquiring data. This data leaves scan engine 80 via flex cable 65 (see FIGS. 4–6). The data then enters motherboard 66, where it is decoded (as described in U.S. Pat. No. 5,258,604). From motherboard 66, the data flows through connector 62 into the daughterboard at pin 19 of microprocessor 150 (see FIG. 9). The microprocessor 150 continuously monitors the data flow, looking for the end of text (ETX) code preceded by the start of transmission (STX) code—that is to say, looking for a "packet" of data.

When a packet is detected, the microprocessor 150 readies, processes, reformats and outputs the data packet into a protocol (described below) suitable for transmission through driver 160. In this regard, please see FIG. 8, showing the aforementioned steps, and FIG. 9, showing the circuit schematic.

The microprocessor 150 puts a low on its pin 5, which is connected to the base of npn transistor 1200. Thus, transistor 1200 is put into an open circuit condition, which presents a logic high (9v is the example) into the driver circuit 160 at pin 13 of NAND gate 1240. NAND gate 1240's output is applied to the base of pnp transistor 1250, which puts transistor 1250 into a closed circuit condition, thereby connecting transducer 975 to its source of power, the 9V source connected to the emitter of pnp transistor 1250.

Next, an ultrasonic signal, for example, a 40 KHz signal, is present on pin 4. The first high of the square wave on pin 4 passes through NAND gates 1220 and 1210, each of which are connected in parallel so as to have common outputs and common inputs. Thus, these NAND gates act as a single inverter, producing a signal inverse to that on pin 4 which enters NAND gate 1230, which has its inputs wired together so as to make it an inverter, with its pin 10 output appearing on pin 12 input of NAND gate 1240. Thus, NAND gate 1240 receives a square wave at the same frequency as that originally output from pin 4 of the microprocessor 150. NAND gate 1240 inverts the signal it received, and outputs it to transistor 1250. As the output value of transistor 1250 always is equal to that of pin 4 such that the same wave (with perhaps only slight delay) is realized as at pin 4 of the microprocessor 150.

As mentioned above, the data will be transmitted according to a predetermined protocol, illustrated in FIG. 10, which is a block diagram of the transmitter protocol according to the present invention. Note that there are eight sections to the packet according to the protocol, namely: (1) AGC bits, (2) Unit ID—a number unique to a transmitter/receiver pair, that is settable by a dip switch or by other convenient methods in hardware or software; (3) #send—(numtry)—the number of times that a particular packet has been sent; (4) #Data=N, the number of bits in the byte that immediately follows; (5) Data 1...n the actual eight-bit byte which is sent in an eleven bit sequence begun by the start bit, followed by the eight data bits, which are immediately followed by the odd parity bit, with the packet ended by the stop bit; (6) Baudrate, which is the rate at which the receiver should use to forward received data into the data processing equipment (It should be noted that this rate will typically be a standard data transfer rate, regardless of what the transmission rate into the receiver was); (7) Vertical Checksum—the logical XOR of all bytes from unit ID to the baud rate; (8) Horizontal Checksum—the logical OR of all bytes from unit ID to the Vertical Checksum.

Reference is now made to FIG. 11, which is a signal timing diagram showing the signals used to implement the transmitter protocol of FIG. 10.

Note that:

"1" is represented by 2.5 ms silence followed by 0.5 ms ultrasonic sound;

"0" is represented by 3.0 ms of silence;

"Start bit" is represented by 1.0 ms of sound; "Stop bit" is represented by 3.0 ms of sound; "AGC bit" is represented by 3.0 ms of sound followed by 3.0 ms of silence.

Thus a (packet according to the protocol) is (AGC bits/ Unit ID/#send/#data/Databits/Baud/VertChksm/ HorizChksm)

FIG. 12 is a block diagram showing the actual protocol of FIG. 10 being used to send a message—the barcode letter "A". Seven boxes, each having a hexadecimal number, are provided.

FIG. 13 is a signal timing diagram showing the signals used to send the message of FIG. 12. The signal traces should be read from left to right as one continuous stream, beginning with the AGC.

Figure 14:
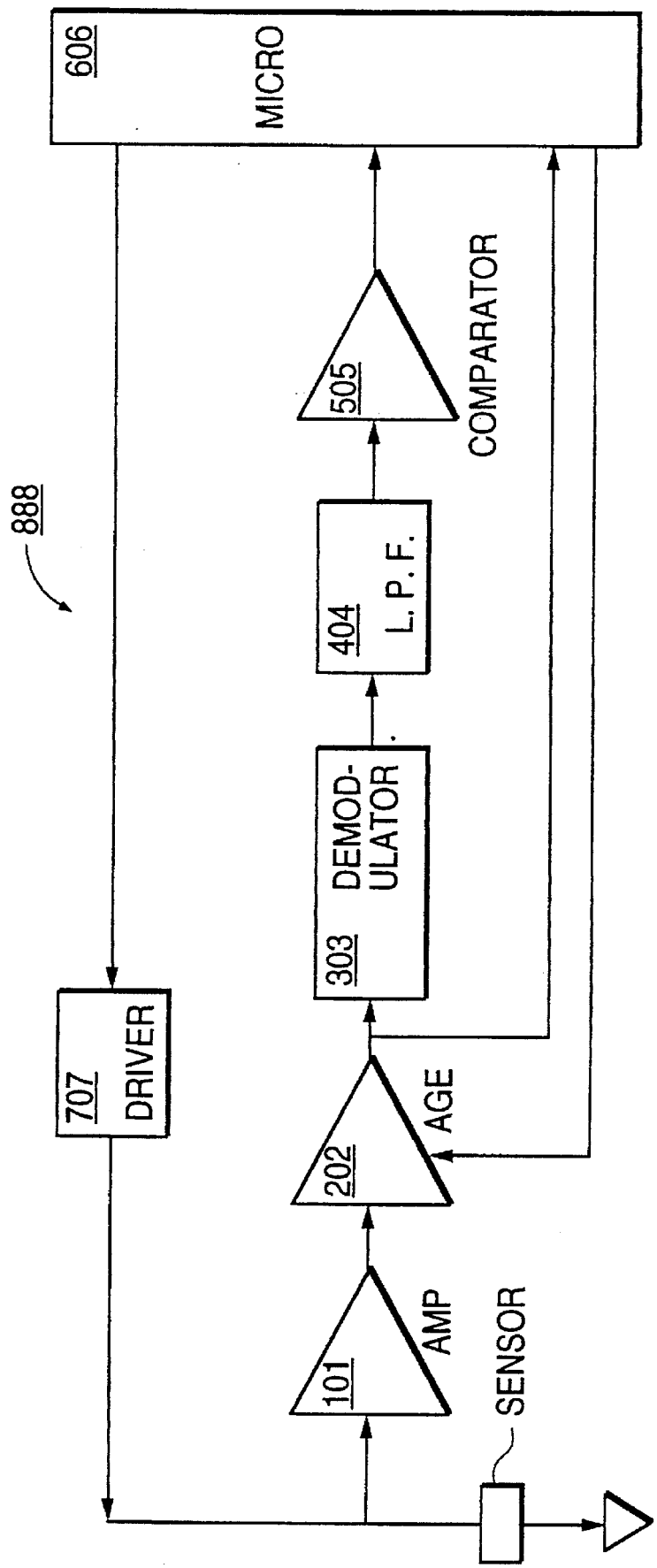
FIG. 14 is a block diagram of a receiver according to the present invention.

FIG. 14 is a block diagram of a receiver according to the present invention.

Note that the receiver 888 according to the present invention comprises an ultrasonic receiver 927, an amplifier 101, an automatic gain set switch 202, a demodulator 303, a microprocessor 606, and a driver 707. The receiver 888 here, as above, can be any one of a number of commercially available receivers and transmitters, such as those manufactured by MuRata, including models MA40B5R (optimized for receiving) and MA40B5S (optimized for sending) and available from MILGRAY/UPSTATE NEW YORK, represented by JHA, 970 Perinton Hills Office Park, Fairport, N.Y. 14450.

Figure 15:
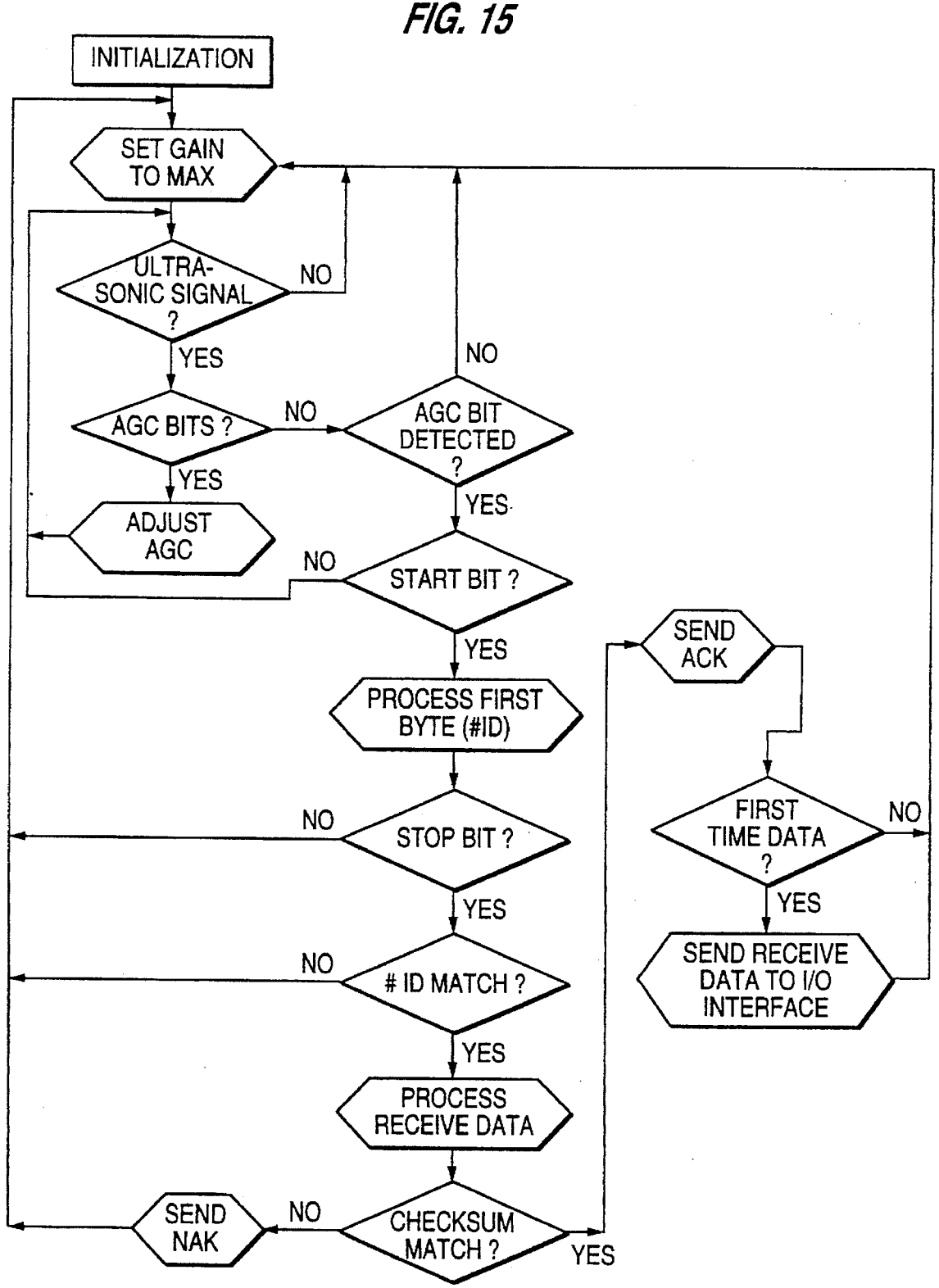
FIG. 15 depicts a transmission/reception protocol; according to the present invention.

FIG. 15 is a flowchart of the operation of a receiver according to the present invention. Following initialization, the receiver has its gain set on maximum while it waits for a signal. When a signal has been transmitted in the manner described above, the ultrasonic receiver detects it, and tests it to see if the signal is AGC bits (a square wave, 3 ms on, 3 ms off)—thus marking the beginning of a transmission.

Figure 16:
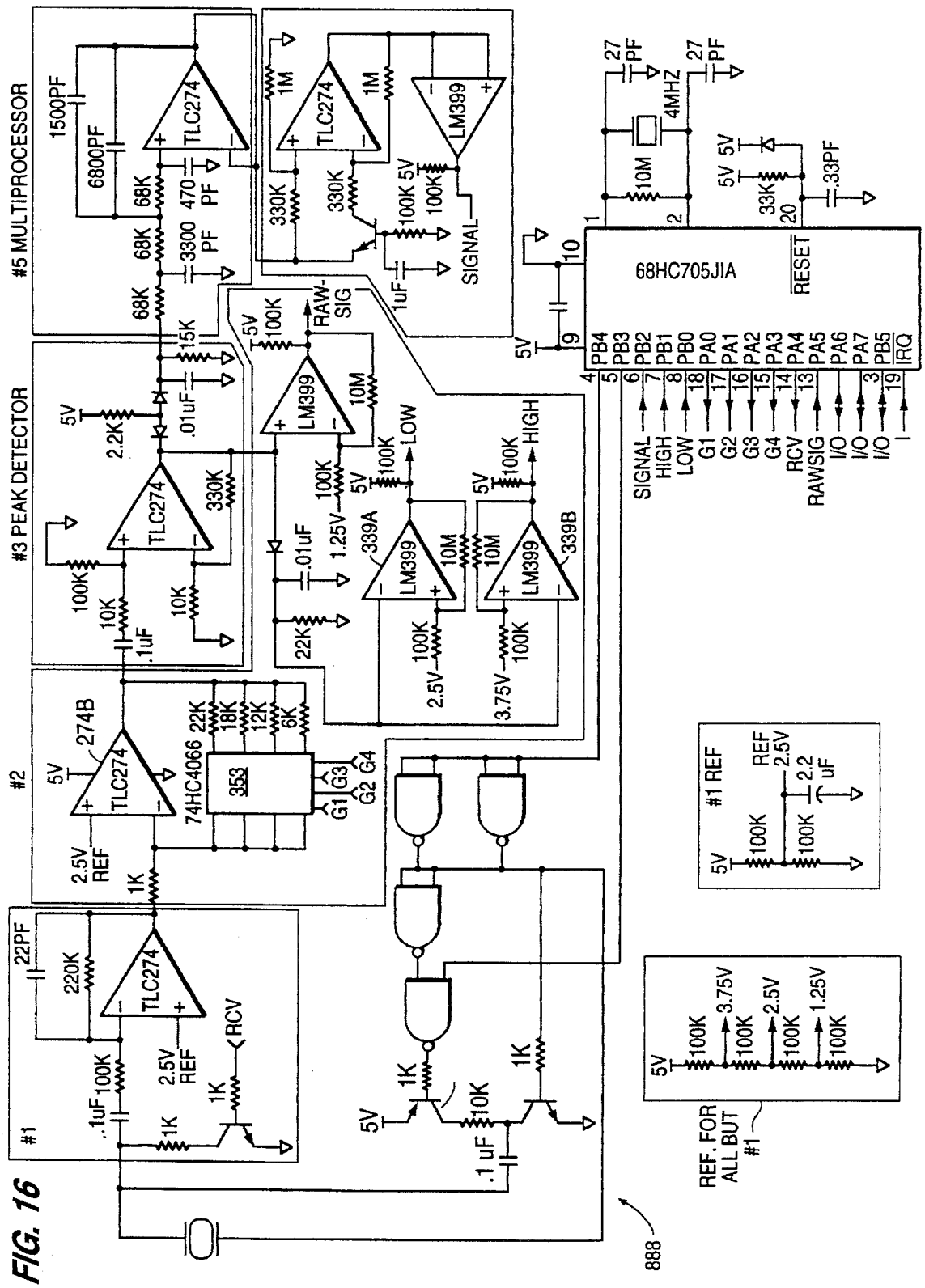
FIG. 16 is an electrical schematic of a receiver according to the present invention.

If the detected signal is AGC bits, the receiver works to automatically adjust the gain, in the manner shown in FIG. 15 and with AGC circuit #2 as shown in FIG. 16. Referring now to FIG. 16, there is provided a comparator window 339, which comprises comparators 339A and 339B, both of which have their inverting terminals tied to the signal output of op-amp TLC274 in peak detector 3. Comparator 339A has three terminals: (1) a non-inverting terminal, connected to 2.5 volts, (2) an inverting terminal connected to the received conditioned signal from op-amp TLC274 of peak detector 3, and (3) an output terminal 340A connected to pin 8 of microprocessor 150. Comparator 339B has three terminals: (1) a non-inverting terminal, connected to 3.75 volts, (2) an inverting terminal connected to the received conditioned signal from op-amp TLC274 of peak detector 3, and (3) an output terminal 340, connected to pin 7 of microprocessor 150. This window comparator configuration has both outputs 340A and 340B high when the signal is below 2.5 volts, has output 340A low and 340B low when the signal is above 3.75 volts, and output 340A low and 340B high when the signal is between 2.5 volts and 3.75 volts. Note that the outputs of comparators 339A and 339B are input into microprocessor pins 8 and 7, respectively.

In accordance with the present invention, the received signal passes from the ultrasonic receiver 927 to amplifier 101, through op-amp 274B, which has its non-inverting input connected directly to a 2.5 volt reference and its inverting input connected, via any combination of four resistors switched by switch 353, to its own output terminal 275. Any or all of these resistors may be switched to selectively set the gain of the AGC. FIG. 16 is an electrical schematic of a receiver according to the present invention. The switching of the resistors by switch 353 is controlled by microprocessor output lines G1, G2, G3, G4, respectively linking microprocessor pins 18, 17, 16, and 15 to switch 353 inputs G1, G2, G3, and G4.

FIG. 17A is a perspective view of a scanner endcap according to the present invention, showing an endcap adapted to receive and/or house an ultrasonic transceiver. FIG. 17B is a top view of the endcap in FIG. 17A.

FIG. 18 depicts one embodiment of a base stand according to the present invention according to the present invention. (charger and downlink).

FIG. 19 depicts a cash register receiver used in connection with the present invention.

FIG. 20 depicts a wedge receiver used in connection with the present invention.

FIG. 21 depicts a fixed position scanner used in accordance with the present invention.

FIG. 22 depicts a conventional handless bar code scanner, and which requires cable 38 to carry signals from arm unit 28 to belt data processing/recording/transmitting unit 40.

FIG. 23 depicts a RF repeater 91b used in connection with the present invention. It is somewhat similar to that of FIG. 22 but has eleminated the cable 38 of FIG. 22, and instead uses an ultrasonic link of the type disclosed herein. The link is established between the two ultrasonic transducers, each labelled 17A, to carry signals from arm unit 28 to belt data processing/recording/transmitting unit 40 without the need for a cable 38, as was used in FIG. 22. Note that the signal received at 17A on unit 40 may be reprocessed and/or retransmitted as RF from RF transmitter or transceiver 91b, thus allowing for increased range of operation.

We claim:

1. A bar code scanner, comprising:
   an ultrasonic sensor configured to transmit ultrasonic frequencies and to receive ultrasonic frequencies;
   an amplifier connected to the ultrasonic sensor and configured to amplify the received ultrasonic frequencies as an amplified signal;
   a demodulator connected to the amplifier and configured to demodulate the amplified signal as a demodulated signal;
   a low pass filter connected to the demodulator and configured to filter out any frequency components of the demodulated signal above a predetermined frequency and to output a filtered signal as a result thereof;

a comparator connected to the low pass filter and configured to determine if the filtered signal exceeds a predetermined voltage threshold;

an ultrasonic driver connected to the ultrasonic sensor and configured to receive digital data and to convert the digital data into an ultrasonic signal that is provided to the ultrasonic sensor to be transmitted over-the-air; and a processor connected to the comparator and to the ultrasonic driver, the processor configured to output the digital data to be transmitted over-the-air to the ultrasonic driver, the processor configured to receive the comparison result from the comparator in order to determine a time period in which no ultrasonic signals are detected in order to transmit the digital data as the ultrasonic signal over-the-air.

2. The bar code scanner according to claim 1, wherein the ultrasonic sensor, amplifier, demodulator, low pass filter, comparator, driver and processor are housed in a single unit, and wherein the bar code scanner further comprises:

an ultrasonic receiver housed separately from the single unit and located within a predetermined range that is greater than a minimum range and less than a maximum range from the single unit, said ultrasonic receiver configured to receive the ultrasonic signal transmitted over-the-air from the ultrasonic sensor, said ultrasonic receiver including means for outputting an acknowledgement signal to the ultrasonic sensor when the ultrasonic signal transmitted over-the-air from the ultrasonic sensor is received.

3. The bar code scanner according to claim 2, wherein the ultrasonic receiver further includes means for demodulating the ultrasonic signal and for obtaining the digital data as a result thereof, wherein the acknowledgement signal is sent back to the ultrasonic sensor only when the digital data is correctly decoded by the ultrasonic receiver.

4. The bar code scanner according to claim 1, wherein the processor has means for causing the ultrasonic sensor to repeat sending of the ultrasonic signal to the ultrasonic receiver a predetermined number of times if an acknowledgement signal is not received from the ultrasonic receiver within a predetermined time after the ultrasonic signal was transmitted over-the-air.

5. The bar code scanner according to claim 1, wherein the processor includes means for sending the digital data as a plurality of packets to the ultrasonic driver, such that the ultrasonic sensor sends the plurality of packets as a corresponding plurality of ultrasonic signals.

6. The bar code scanner according to claim 5, wherein each of the ultrasonic signals are represented by a plurality of ultrasonic bits, each of said ultrasonic bits corresponding to one bit of the digital data, said each of said ultrasonic bits being represented by no ultrasound for a first predetermined amount of time to represent a binary zero bit of the digital data, and a transmission of no ultrasound for a second predetermined amount of time followed by a transmission of ultrasound at a prespecified ultrasonic frequency for a third predetermined amount time to represent a binary one bit of the digital data, wherein a sum of the second and third predetermined amounts of time corresponds to the first predetermined amount of time.

7. The bar code scanner according to claim 6, wherein each of the ultrasonic signals are represented by a plurality of ultrasonic bits, said ultrasonic bits including send and start bits which have a different format from the respective ultrasonic bits corresponding to the binary one bit and binary zero bit, and wherein the ultrasonic receiver detects the send and start bits to determine a respective beginning and end of an ultrasonic packet of data.

8. The bar code scanner according to claim 6, wherein the ultrasonic receiver is connected via a wired connection to a cash register, and wherein the single unit corresponds to a hand-held bar code scanner.

9. The bar code scanner according to claim 6, wherein the ultrasonic receiver is connected via a wired connected to a personal computer, and wherein the single unit corresponds to a hand-held bar code scanner.

10. The bar code scanner according to claim 6, wherein the single unit is connected to a fixed bar code scanner, and wherein the ultrasonic receiver is connected to at least one of a cash register and a computer terminal.

11. The bar code scanner according to claim 6, wherein the single unit includes means for affixing the single unit to an arm of a user, and wherein the ultrasonic receiver includes means for affixing the ultrasonic receiver to a belt being worn by the user, and wherein the ultrasonic receiver includes means for retransmitting the digital data received via ultrasonic signals over-the-air from the single unit as radio frequency signals to another location.

12. A bar code scanner having means for generating data formatted in accordance with a predetermined protocol, said protocol including data representing control data and data representing the bar code, said bar code scanner comprising:

separate transmitter and receiver means, each including means for ultrasonically transmitting and receiving data, respectively, said receiver means further including means for transmitting an acknowledgement signal when the protocol is received, wherein the receiver means sends the acknowledgement signal to the transmitter means which, unless it receives the acknowledgement signal, will retransmit the protocol a predetermined number of times, wherein the transmitter means includes a receiver which monitors an ultrasonic frequency band for a time period in which transmission by the transmitter means is not allowed, wherein the time period corresponds to when another ultrasonic signal in the ultrasonic frequency band is detected by the receiver of the transmitter means, and wherein transmission by the transmitter means is allowed as soon as the another ultrasonic signal is no longer detected by the receiver of the transmitter means.

\* \* \* \* \*

UNITED STATES PATENT AND TRADEMARK OFFICE
CERTIFICATE OF CORRECTION

Page 1 of 2

PATENT NO. : 5,665,956
DATED : September 9, 1997
INVENTOR(S) : Chay La, et al.

It is certified that error appears in the above-identified patent and that said Letters Patent is hereby corrected as shown below:

Sheet 12 of 17 consisting of Figure 16 should be deleted to appear as per attached sheet.

Signed and Sealed this

Fourteenth Day of April, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,665,956
DATED : September 9, 1997
INVENTOR(S) : LA et al.

It is certified that error appears in the above-identified patent and that said Letters Patent is hereby corrected as shown below:

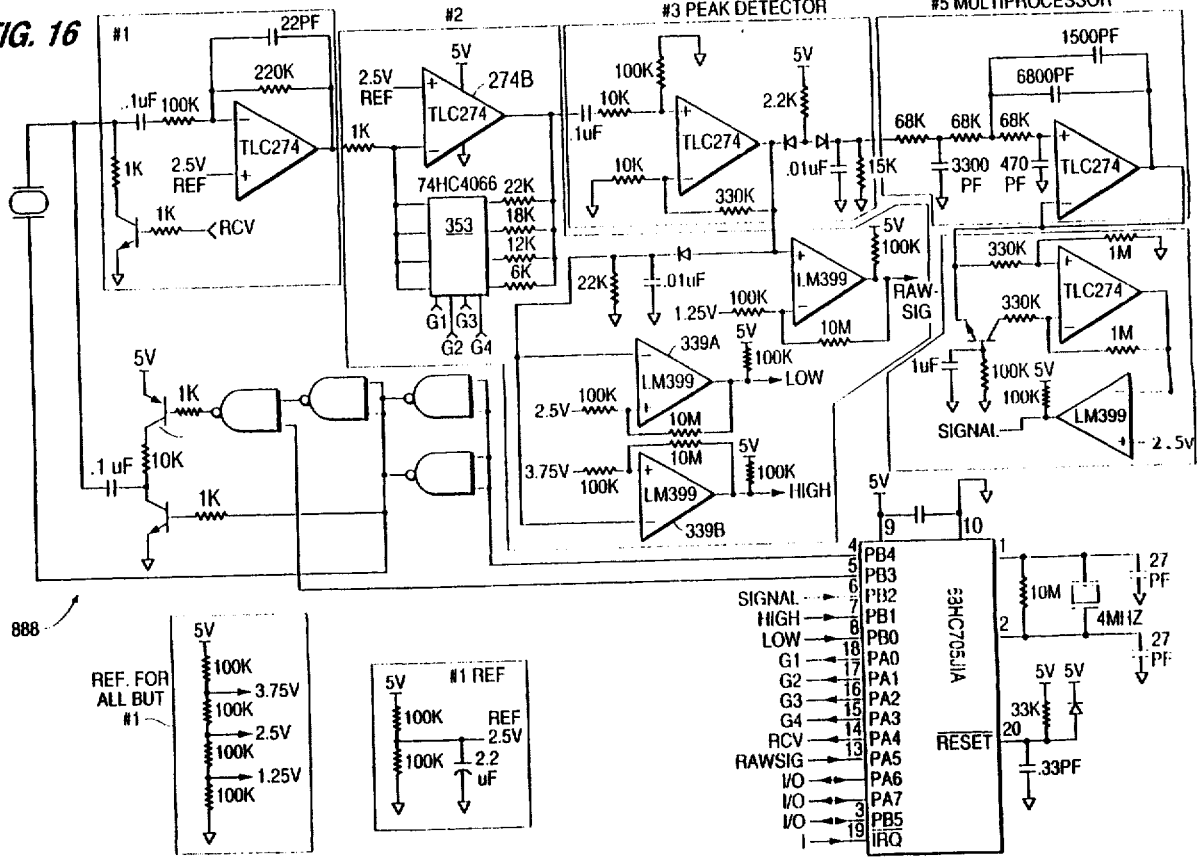

FIG. 16